(12) United States Patent  
Mehendale et al.

(10) Patent No.: US 7,931,041 B2  
(45) Date of Patent: Apr. 26, 2011

(54) SYSTEM AND METHOD FOR CONTROLLING LIQUID LEVEL IN A VESSEL

(75) Inventors: Charudatta Subhash Mehendale, Niskayuna, NY (US); Bruce Gordon Norman, Burnt Hills, NY (US); Erhan Karaca, Clifton Park, NY (US); Rajeeva Kumar, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 796 days.

(21) Appl. No.: 11/959,554

(22) Filed: Dec. 19, 2007

(65) Prior Publication Data

US 2009/0159018 A1 Jun. 25, 2009

(51) Int. Cl.  
*F17D 3/00* (2006.01)

(52) U.S. Cl. .................... 137/11; 137/389; 122/451 R

(58) Field of Classification Search .............. 122/448.1, 122/451 R; 137/11, 389  
See application file for complete search history.

(56) References Cited

U.S. PATENT DOCUMENTS

| 3,042,007 | A | * | 7/1962 | Chien et al. ............... 122/448.1 |
| 4,050,418 | A | * | 9/1977 | Watanabe .................. 122/451 R |
| 4,242,989 | A | | 1/1981 | Chamberlain |
| 4,457,266 | A | * | 7/1984 | La Spisa ..................... 122/451.1 |
| 4,497,283 | A | * | 2/1985 | LaSpisa et al. ............. 122/451.1 |
| 4,619,224 | A | * | 10/1986 | Takita et al. ............... 122/451 R |
| 5,148,775 | A | | 9/1992 | Peet |
| 7,053,341 | B2 | | 5/2006 | Arora et al. |
| 2005/0178759 | A1 | | 8/2005 | Arora et al. |

FOREIGN PATENT DOCUMENTS

GB 2411011 A 8/2005

* cited by examiner

*Primary Examiner* — Craig M Schneider  
(74) *Attorney, Agent, or Firm* — Ann M. Agosti

(57) ABSTRACT

A system includes sensors configured to measure vessel parameters. A signal processing unit receives sensor output signals and generates a first, second, third, fourth, and fifth filtered output signals representative of liquid level, gas flow rate, feed-liquid flow rate, vessel pressure, and vessel temperature, respectively. A flow demand control unit receives the first filtered output signal and generates an output signal representative of feed-liquid flow demand. A shaping unit receives the second, fourth, and fifth filtered output signals and generates an output signal representative of shaped gas flow rate. A liquid level control unit controls the liquid level within predetermined limits by controlling one or more components based on the output signals from the flow demand control unit, the shaping unit, and the third filtered output signal.

21 Claims, 3 Drawing Sheets

SYSTEM AND METHOD FOR CONTROLLING LIQUID LEVEL IN A VESSEL

BACKGROUND

The system and method disclosed herein relate generally to controlling liquid level in a vessel and, more specifically, to controlling water level in a drum type boiler in a power plant.

Drum type boilers are the most commonly used boilers in power generation plants. Drum level trips are a frequent cause of trips and disruptions in a power station. In the power generation industry, drum level trips due to drum level control behavior during transient operations are the major cause of disruption in power generation and lead to huge loss of plant availability and revenue.

Control of drum water level is a challenging problem due to complicated dynamics of 2 phase flows, presence of waves, unknown heat and pressure disturbances, and load demands. Maintaining water level within limits is critical, as exceeding the limits will lead to trips or damage the equipment. The drum boiler has to operate in the presence of various unknown pressure and load (thermal) disturbances while maintaining water level within required limits. A drop in water level will cause thermal fatigue in the drum. An increase in water level significantly increases the possibility of water droplets entering a superheater/steam turbine and thus damaging the superheater/steam turbine.

Conventional approaches to control of water level typically include actuation of a feed water control valve that supplies water to the drum. However, such approaches to control water level are challenging for drum type boilers, especially during transient operating conditions due to inverse response exhibited by such systems. The magnitude of a controller response to inverse characteristics of the feed water flow demand is dependent on the drum boiler pressure. At lower drum boiler pressures, the effect of controller response to inverse characteristics of the feed water flow demand is exacerbated. Typical strategies to control drum boiler water level requires good measurement or estimation of steam flow rate, feed water flow rate, and water level. Incorrect measurements (such as due to faults or sensor malfunctions) may cause the plant to trip.

There is a need for a more effective technique for controlling a liquid level in a vessel, such as for example, controlling a liquid level in a drum type boiler, especially during transient operating conditions.

BRIEF DESCRIPTION

In accordance with one exemplary embodiment of the present invention, a level control system for controlling a liquid level in a vessel having a two-phase medium is disclosed. The level control system includes sensors configured to measure parameters related to the vessel. The parameters include liquid level in the vessel, gas flow rate from the vessel, pressure in the vessel, temperature of the vessel, and feed-liquid flow rate into the vessel. A signal processing unit is configured to receive output signals from the sensors and generate a first filtered output signal representative of liquid level in the vessel, a second filtered output signal representative of gas flow rate from the vessel, a third filtered output signal representative of feed-liquid flow rate into the vessel, a fourth filtered output signal representative of pressure in the vessel; and a fifth filtered output signal representative of temperature of the vessel. A flow demand control unit is configured to receive the first filtered output signal and generate an output signal representative of feed-liquid flow demand. A shaping unit is configured to receive the second, fourth, and fifth filtered output signals and generate an output signal representative of shaped gas flow rate as a function of pressure, temperature, or combination thereof in the vessel. A liquid level control unit is configured to control the liquid level in the vessel within predetermined limits by controlling one or more components coupled to the vessel based on the output signals from the flow demand control unit, the shaping unit, and the third filtered output signal.

In accordance with another exemplary embodiment of the present invention, a level control system for controlling a water level in a boiler having a two-phase medium is disclosed. The level control system includes sensors configured to measure parameters related to the boiler drum. The parameters include water level in the boiler drum, steam flow rate from the boiler drum, pressure in the boiler drum, temperature of the boiler drum, and feed-water flow rate into the boiler drum. A signal processing unit is configured to receive output signals from the sensors and generate a first filtered output signal representative of water level in the boiler drum, a second filtered output signal representative of steam flow rate from the boiler drum, a third filtered output signal representative of feed-water flow rate into the drum, a fourth filtered output signal representative of pressure in the drum, and a fifth filtered output signal representative of temperature of the drum. A flow demand control unit is configured to receive the first filtered output signal and generate an output signal representative of feed-water flow demand. A shaping unit is configured to receive the second, fourth, and fifth filtered output signals and generate an output signal representative of shaped steam flow rate as a function of pressure, temperature, or combination thereof in the drum. A liquid level control unit is configured to control the water level in the vessel within predetermined limits by controlling one or more components coupled to the drum based on the output signals from the flow demand control unit, the shaping unit, and the third filtered output signal.

In accordance with another exemplary embodiment of the present invention, a method for controlling a liquid level in a vessel having a two-phase medium is disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
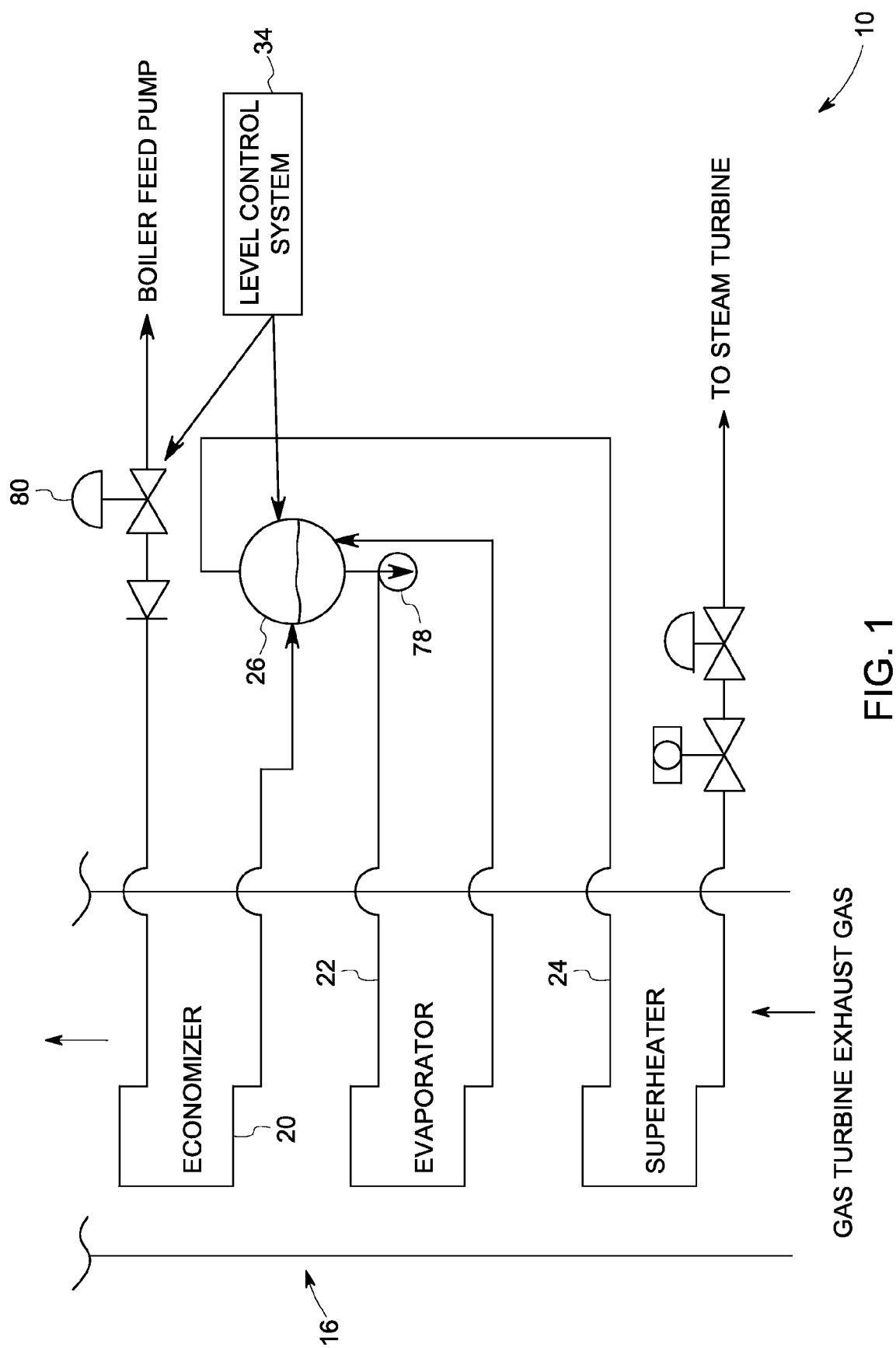
FIG. 1 is a diagrammatical view of a combined cycle power plant having a boiler drum with a liquid level control system in accordance with an exemplary embodiment of the present invention.
Figure 2:
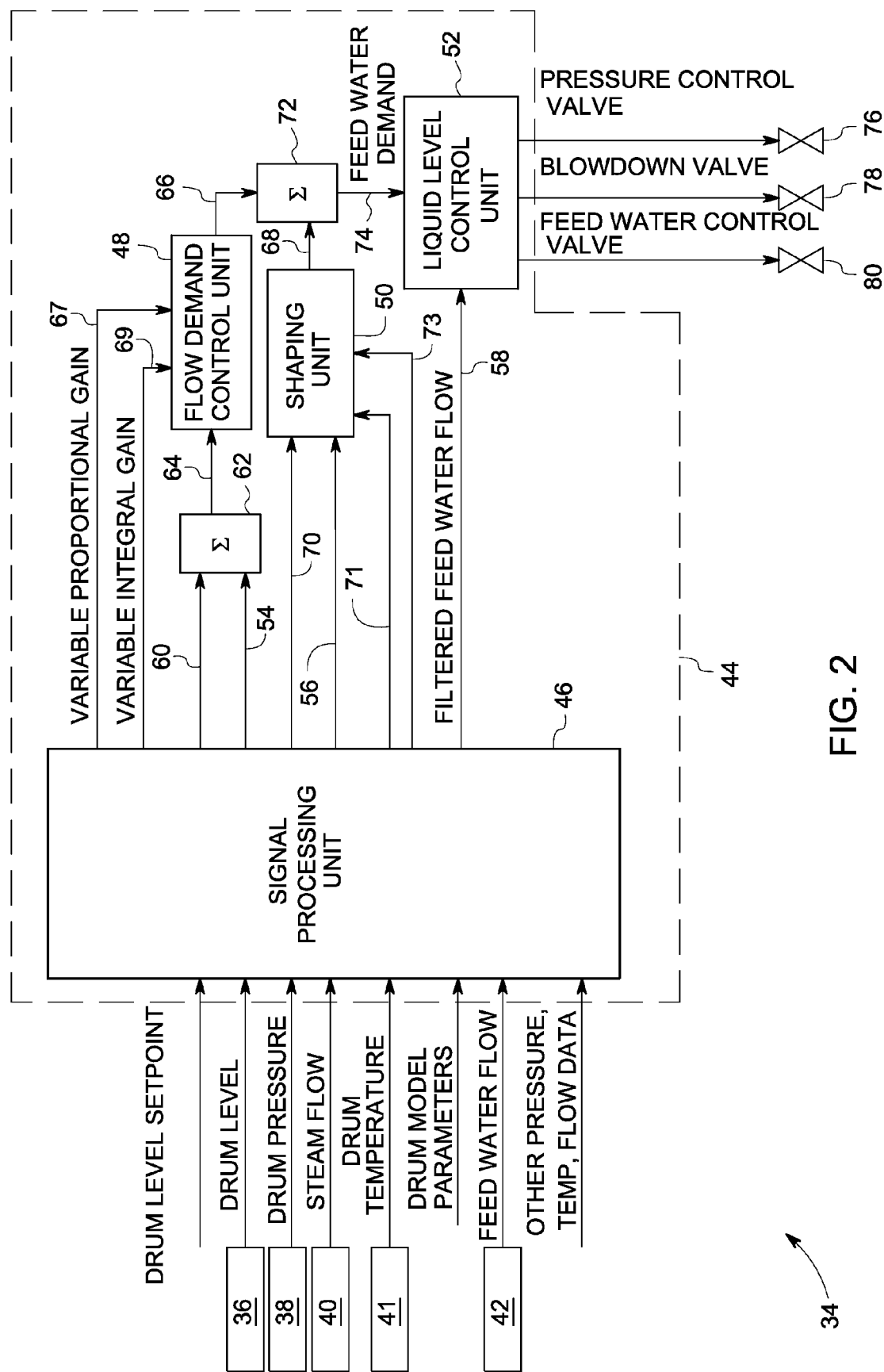
FIG. 2 is a diagrammatical view of a water level control system in accordance with the aspects of FIG. 1.

As discussed in detail below, embodiments of the present invention provide a level control system 34 for controlling a liquid level in a vessel 26 having a two-phase medium i.e. both liquid and gas (FIG. 1). The control system has sensors 36, 38, 40, 41 and 42 provided to measure parameters relating to the vessel including liquid level in the vessel, pressure in the vessel, gas flow rate from the vessel, temperature of the vessel, and feed-liquid flow rate into the vessel (FIG. 2). A signal processing unit 46 receives output signals from sensors and generates a first filtered output signal representative of liquid level in the vessel, a second filtered output signal representative of gas flow rate from the vessel, a third filtered output signal representative of feed-liquid flow rate into the vessel, a fourth filtered output signal representative of pressure in the vessel, and a fifth filtered output signal representative of temperature of the vessel (FIG. 2). A flow demand control unit 48 receives the first filtered output signal and generates an output signal representative of feed-liquid flow demand, a shaping unit 50 receives the second, fourth, and fifth filtered output signals and generates an output signal representative of shaped gas flow rate as a function of pressure, temperature, or combination thereof in the vessel, and a liquid level control unit 52 controls the liquid level in the vessel within predetermined limits by controlling one or more components coupled to the vessel based on the output signals from the flow demand control unit, the shaping unit, and the third filtered output signal so as to meet the flow-liquid flow demand (FIG. 2).

In accordance with another exemplary embodiment of the present invention, a level control system for controlling a water level in a boiler drum having a two-phase medium i.e. water and steam is disclosed. In accordance with yet another exemplary embodiment of the present invention, a method for controlling a liquid level in a vessel having a two-phase medium is disclosed. The exemplary system and method disclosed herein generates appropriate feed-water commands to maintain the drum water level within required limits during transient operating conditions such as, for example, during presence of load and pressure variations in the system. The exemplary technique may additionally include gas flow estimation, a liquid level estimation, additional control loops to improve feed-liquid flow response, or combinations thereof. The exemplary technique may also involve using a gas flow rate signal shaping for generating a set point of the feed water flow command. Although the embodiments described below are with reference to controlling water level in a boiler drum, the exemplary system and method are equally applicable to safe operation of other systems having a vessel containing at least a two-phase fluid with one example being the controlling of a level of liquid helium in superconducting cavities.

Referring to FIG. 1, an exemplary combined cycle power plant 10 is illustrated. The combined cycle power plant 10 includes at least one gas turbine-generator and at least one steam turbine-generator interconnected via a heat recovery steam generator (HRSG) 16. Hot exhaust gas from a gas turbine is input into the HRSG 16 to produce steam for a steam turbine. The HRSG 16 may be divided into a plurality of sections such as an economizer 20, evaporator 22, and a superheater 24. Further, as part of the steam producing cycle, a boiler drum 26 is coupled to HRSG 16. A boiler feed pump is configured to supply feed water to the boiler drum 26 via a feed water control valve 80. The boiler drum 26 is also coupled to a blow down valve 78 configured to continuously regulate concentration of solids in the boiler drum 26. Descriptions of cycle operation are currently available to those having ordinary skill in the art and need not be further explained in order to obtain an understanding of the combined cycle power plant 10.

In the illustrated embodiment, a level control system 34 is provided for controlling water level in the boiler drum 26 having a two-phase medium. As discussed previously, control of drum water level is a challenging problem due to complicated dynamics of two-phase flows, presence of waves, unknown heat and pressure disturbances and load demands. Maintaining water level within limits is necessary to avoid trips and damage to equipment. In the case of power generation systems equipped with drum boilers, the major disturbances to the drum water level are the transient pressure disturbances and heat flux disturbances. The illustrated level control system 34 is configured to effectively control drum water level during such disturbances. Details of control system 34 are explained in greater detail below with reference to subsequent figures.

Referring to FIG. 2, a level control system 34 is illustrated in accordance with the aspects of FIG. 1. As discussed above, the level control system is configured for controlling a water level in the boiler drum having two-phase medium. The level control system 34 includes a plurality of sensors configured to measure parameters related to the boiler drum. In the illustrated embodiment, the plurality of sensors include a drum level sensor 36 configured to detect water level in the boiler drum 26, a pressure sensor 38 configured to measure pressure in the boiler drum 26, steam flow sensor 40 configured to measure steam flow rate from the drum, temperature sensor 41 configured to measure temperature of the drum, and feed-water flow sensor 42 configured to measure feed-water flow rate into the drum. The system 34 also includes a controller 44 having a signal processing unit 46, a flow demand control unit 48, a shaping unit 50, and a liquid level control unit 52. Controller 44 and the units described herein may be embodied in one or more physical computing units. The signal processing unit 46 is configured to receive output signals from the sensors 36, 38, 40, 41, and 42 and generate a first filtered output signal 54 representative of water level in the boiler drum, a second filtered output signal 56 representative of steam flow rate from the boiler drum, a third filtered output signal 58 representative of feed-water flow rate into the boiler drum, and a fourth filtered output signal 70 representative of pressure in the boiler drum, and a fifth filtered output signal 71 representative of temperature of the boiler drum. In certain other exemplary embodiments, the signal processing unit additionally uses a plurality of drum geometric parameters, drum material properties, drum operating parameters, or a combination thereof for generating the output signals 54, 56, 58, 70, and 71. In some embodiments, the drum geometric parameters and material properties may include metal mass, length, volume, thermal conductivity, specific heat, and surface area. In some other embodiments, the drum geometric parameters and material properties may include parameters of downcomer (not shown) such as metal mass, volume, cross sectional area, surface area, length, metal mass, and friction factor. In some other embodiments, the drum geometric parameters and material properties may include evaporator parameters such as metal mass, length, volume, cross sectional area. surface area, friction factor, specific heat, conductivity, internal and external diameters. In certain other exemplary embodiments, other operating parameters such as pressure, temperature, and flow data at predetermined locations of the power plant may additionally be used for generating the output signals 54, 56, 58, 70, and 71. In some embodiments, the pressure data may include steam turbine throttle pressure, steam turbine exit pressure and leakages, ambient pressure, and condenser pressure. In some other embodiments, temperature data may include steam turbine exit steam temperature, feed water temperature, and flue gas temperature. In some other embodiments, flow data may include flue gas flow rate, and blowdown flow rate.

In certain exemplary embodiments, the signal processing unit 46 is configured to generate a filtered output signal 60 representative of a water level set point in the boiler drum. In some embodiments, the signal processing unit 46 generates the filtered output signal 54 representative of an estimated water level in the boiler drum based on a detected water level in the boiler drum. In certain other exemplary embodiments, a separate estimation unit may be used to estimate water level in the boiler drum. It should also be noted that water level estimation facilitates mitigation of problems associated with surface wave motions in the drum during transient operating conditions. In the illustrated embodiment, a level processing unit 62 is configured to receive the signals 54, 60 and generate a filtered output signal 64. It should be noted herein that the output signal 64 is the difference between the output signals 54, 60. The flow demand control unit 48 is configured to receive the filtered output signal 64 and generate an output signal 66.

The signal processing unit 46 may further be configured to generate at least one controller gain. In this embodiment, the at least one controller gain includes a variable proportional gain 67 and a variable integral gain 69 determined based on a water level set point and a detected water level in the drum. The flow demand control unit 48 is configured to use the variable controller gains to generate the output signal 66. In some other embodiments, the at least one controller gain may include a constant gain. In the exemplary embodiment, utilization of a feedback loop is disclosed wherein averaging level control is implemented via the use of independently scheduled proportional and integral gains. It should be noted herein that the scheduling variable is dependent on the difference between the measured water level and the water level set point. The gains are scheduled such that controller induced water level oscillations are avoided. In addition, the controller gains are scheduled such that valve chattering is avoided for smaller water level deviations of the measured value from the set value.

The shaping unit 50 is configured to receive the second filtered output signal 56, fourth filtered output signal 70, and fifth filtered output signal 71, and generate an output signal 68 representative of shaped steam flow rate as a function of pressure, or temperature, or combination thereof in the boiler drum. In the illustrated embodiment, the signal processing unit 46 is also configured to generate at least one gas filter parameter 73, e.g. a variable gas filter parameter. The at least one gas filter parameter 73 is also used to generate the output signal 68. The gas filter parameter may be a function of the pressure and/or the temperature in the boiler drum. In some embodiments, the gas filter parameter 73 includes a constant parameter. In certain exemplary embodiments, the signal processing unit 46 is configured to receive an output signal from the pressure sensor 38 and generate an output signal representative of estimated steam flow rate from the boiler drum based on the output signal from the pressure sensor 38. In certain exemplary embodiments, the signal processing unit 46 is configured to receive an output signal from the temperature sensor 41 and generate an output signal representative of estimated steam flow rate from the boiler drum based on the output signal from the temperature sensor 41. The gas filter parameter may be determined based on the estimated steam flow rate and actual measured steam flow rate. Steam flow estimation provides more accurate flow information during faulty conditions of sensors which may result in unmeasured steam flow out of the drum (for example, opening of relief valve). The steam flow rate estimation facilitates appropriate filtering of the actual steam flow measurement and corrects the measurement in the event of sensor inaccuracy. The discrepancy between the estimated steam flow rate value and measured value may be used to detect steam flow rate sensor faults.

A feed-water demand processing unit 72 is configured to receive the output signals 66, 68 and generate an output signal 74 representative of feed-water flow demand. The output signal 74 representative of feed-water flow demand is the summation of the output signals 66, 68. The liquid level control unit 52 is configured to receive the output signal 74 from the unit 72 and the third filtered output signal 58 representative of feed-water flow rate from the signal processing unit 46. The liquid level control unit 52 is configured to control the water level in the boiler drum within predetermined limits by controlling one or more components coupled to the boiler drum based on the output signals from the flow demand control unit, the shaping unit, and the third filtered output signal so as to meet the feed-water demand. In the illustrated embodiment, the liquid level control unit 52 is configured to control the water level in the boiler drum within predetermined limits by controlling a pressure control valve 76, a blow down valve 78, a feed-water control valve 80, variable frequency pumps (not shown), or combinations thereof coupled to the boiler drum based on the output signals 74, 58.

As discussed above, load or pressure disturbances cause the water level within the drum boiler to swell and shrink due to complex phase changes between steam and water within the drum boiler. During a pressure disturbance transient condition in the boiler drum, the feed-water flow demand reflects an inverse response. In one example, an increased steam flow from the drum results in a decrease in pressure in the drum. The increased steam flow from the drum results in an inverse response of the feed-water demand. As a result, there is an increase in feed-water flow demand into the boiler. Addition of feed-water flow to the drum results in even further increased drum water level, since the water level in the drum may be already swelling due to increased bubbling phenomenon. In another example, a decrease in the steam flow rate from the drum results in an increase in pressure in the drum. As a result, there is a decrease in feed-water flow demand into the boiler. Reduction in feed-water flow to the drum results in even further decreased water level, since the water level in the drum may be already shrinking due to bubble collapsing phenomenon.

It should be noted herein that for effective control of water level within the boiler drum, correct measurement of steam flow rate, feed-water flow rate, and water level in the drum are important. Incorrect measurements due to faulty sensors or malfunctioning of sensors may cause the power plant to trip. For example, existence of a faulty sensor may leading to plant trip if controller gains are too low to regulate liquid level in the drum for a "single-element mode".

In accordance with another exemplary embodiment of the present invention, appropriate shaping of the steam flow rate signal facilitates mitigation of pressure (steam flow) disturbances, as well as load (thermal) disturbances. In other words, shaping of steam flow rate signal facilitates mitigation of problems associated with the controller response described above. In one example, the level control unit is configured to provide an aggressive feed-water flow response to control water level in the drum when there is substantially larger deviation between the water level set point and measured water level and to provide a relatively sluggish feed-water response to control water level in the drum when there is substantially smaller deviation between the water level set point and measured water level (so as to minimize effects of valve chattering). In an exemplary embodiment, integral gain is less aggressive when deviation between water level set point and measured water level is larger, and more aggressive when deviation between water level set point and measured water level is smaller. This reduces controller induced water level oscillations.

Figure 3:
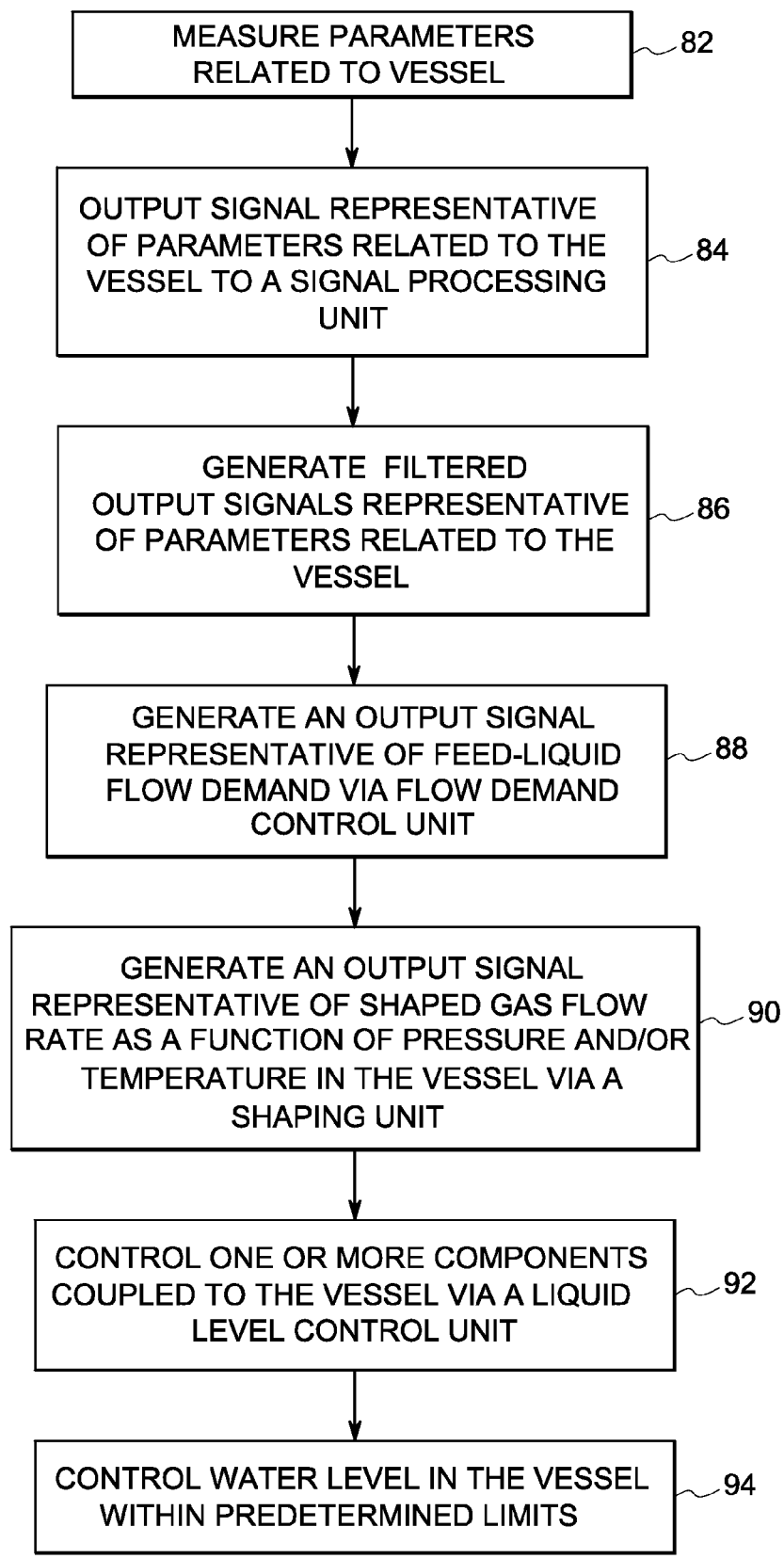
FIG. 3 is flow chart illustrating exemplary steps involved in method of controlling liquid level in a vessel in accordance with an exemplary embodiment of the present invention.

Referring to FIG. 3, a flow chart illustrating exemplary steps involved in a method of controlling liquid level in a vessel in accordance with an exemplary embodiment of the present invention is illustrated. The method includes measuring parameters related to the vessel via a plurality of sensors as represented by the step 82. In the illustrated embodiment, the parameters include liquid level in the vessel, pressure in the vessel, temperature of the vessel, gas flow rate from the vessel, and feed-liquid flow rate into the vessel. The method further includes outputting signals from the sensors to a signal processing unit as represented by the step 84. The signal processing unit receives output signals from the sensors and generates filtered output signals representative of parameters of the vessel as represented by the step 86. The filtered output signals include a first filtered output signal representative of liquid level in the vessel, a second filtered output signal representative of gas flow rate from the vessel, a third filtered output signal representative of feed-liquid flow rate into the vessel, a fourth filtered output signal representative of pressure in the vessel, and a fifth filtered output signal representative of temperature of the vessel.

A flow demand control unit receives the filtered output signal representative of liquid level in the vessel and generates an output signal representative of feed-liquid flow demand as represented by the step 88. The flow demand control unit may also use at least one controller gain to generate the output signal representative of feed-liquid flow demand. In the exemplary embodiment, utilization of a feedback loop is disclosed wherein averaging level control is implemented via the use of independently scheduled proportional and integral gains. The gains are scheduled such that controller induced liquid level oscillations are avoided. In addition, the controller gains are scheduled such that valve chattering is avoided for smaller water level deviations of the measured value from the set value.

A shaping unit receives the second filtered output signals representative of gas flow rate, fourth filtered output signal representative of pressure in the vessel, and fifth filtered output signal representative of temperature of the vessel and generates an output signal representative of shaped gas flow rate as a function of pressure, or temperature, or combination thereof in the vessel as represented by the step 90. The shaping unit may include at least one gas filter parameter to generate the output signal representative of shaped gas flow rate. The gas filter parameter may be determined based on the estimated gas flow rate and actual measured gas flow rate. Gas flow estimation provides accurate flow information during faulty condition of sensors, which may result in unmeasured gas flow out of the drum (for example, opening of relief valve).

A liquid level control unit receives the output signals from the flow demand control unit, shaping unit, and the third filtered output signal representative of feed-liquid flow rate from the signal processing unit. The liquid level control unit controls one or more components coupled to the vessel based on the output signals from the flow demand control unit, the shaping unit, and the third filtered output signal so to meet the feed-water flow demand as represented by the step 92. In the illustrated embodiment, the liquid level control unit controls the liquid level in the vessel within predetermined limits as represented by the step 94. The liquid level control unit controls a pressure control valve, blow down valve, feed-water control valve, variable frequency pumps, or combinations thereof coupled to the vessel based on the output signals from the flow demand control unit, the shaping unit, and the third filtered output signal.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a liquid level in a vessel having a two-phase medium; the system comprising:
    measuring parameters related to the vessel using sensors; wherein the parameters comprise liquid level in the vessel; gas flow rate from the vessel; pressure in the vessel, temperature of the vessel; and feed-liquid flow rate into the vessel;
    generating a first filtered output signal representative of liquid level in the vessel, a second filtered output signal representative of gas flow rate from the vessel, a third filtered output signal representative of feed-liquid flow rate into the vessel, a fourth filtered output signal representative of pressure in the boiler drum, and a fifth filtered output signal representative of temperature of the boiler drum based on the measured parameters;
    generating an output signal representative of feed-liquid flow demand from the first filtered output signal;
    generating an output signal representative of shaped gas flow rate as a function of pressure, temperature, or combination thereof in the vessel from the second, fourth, and fifth filtered output signals; and
    controlling the liquid level in the vessel within predetermined limits by controlling one or more components coupled to the vessel based on the output signal representative of feed-liquid flow demand, the output signal representative of shaped gas flow rate, and the third filtered output signal.

2. The method of claim 1, further comprising generating at least one controller gain and using the at least one controller gain to generate the output signal representative of feed-liquid flow demand.

3. The method of claim 1, further comprising generating at least one gas filter parameter and using the at least one gas filter parameter when generating the output signal representative of shaped gas flow rate as a function of pressure, temperature, or combination thereof in the vessel.

4. A level control system for controlling a liquid level in a vessel having a two-phase medium, the system comprising:
    sensors configured to measure parameters related to the vessel, wherein the parameters comprise liquid level in the vessel, gas flow rate from the vessel, pressure in the vessel, temperature of the vessel, and feed-liquid flow rate into the vessel;
    a controller comprising:
    a signal processing unit configured to receive output signals from the sensors and generate a first filtered output signal representative of liquid level in the vessel, a second filtered output signal representative of gas flow rate from the vessel, a third filtered output signal representative of feed-liquid flow rate into the vessel, a fourth filtered output signal representative of pressure in the vessel; and a fifth filtered output signal representative of temperature of the vessel;
    a flow demand control unit configured to receive the first filtered output signal and generate an output signal representative of feed-liquid flow demand;

a shaping unit configured to receive the second, fourth, and fifth filtered output signals and configured to generate an output signal representative of shaped gas flow rate as function of pressure, temperature, or combination thereof in the vessel; and a liquid level control unit configured to control the liquid level in the vessel within predetermined limits by controlling one or more components coupled to the vessel based on the output signals from the flow demand control unit, the shaping unit, and the third filtered output signal.

5. The system of claim 4, wherein the signal processing unit is configured to receive an output signal from the vessel pressure sensor and generate an output signal representative of estimated gas flow rate from the vessel based on an output signal from the vessel pressure sensor.

6. The system of claim 4, wherein the signal processing unit is configured to use drum geometric parameters, drum material properties, operating parameters, or combinations thereof when generating the filtered output signals.

7. The system of claim 4, wherein the signal processing unit is configured to generate an output signal representative of estimated gas flow rate from the vessel and use the output signal representative of estimated gas flow rate when generating the filtered output signals.

8. The system of claim 4, wherein the signal processing unit is configured to generate a filtered output signal representative of a set liquid level in the vessel.

9. The system of claim 4, wherein the signal processing unit is configured to generate at least one gas filter parameter, and wherein the shaping filter is configured to use the at least one gas filter parameter when generating the output signal representative of shaped gas flow rate as a function of pressure, temperature, or combination thereof in the vessel.

10. The system of claim 4, wherein the signal processing unit is configured to generate at least one controller gain, and wherein the flow demand control unit is configured to use the at least one controller gain to generate the output signal representative of feed-liquid flow demand.

11. The system of claim 10, wherein the controller gain comprises a variable proportional gain and a variable integral gain determined based on a set liquid level in the vessel and a detected liquid level in the vessel.

12. A level control system for controlling a water level in a boiler drum having a two-phase medium; the system comprising:
sensors configured to measure parameters related to the boiler drum, wherein the parameters comprise water level in the boiler drum; steam flow rate from the boiler drum; pressure in the boiler drum, temperature of the boiler drum, and feed-water flow rate into the boiler drum;
a controller comprising:
a signal processing unit configured to receive output signals from the sensors and generate a first filtered output signal representative of water level in the boiler drum, a second filtered output signal representative of steam flow rate from the boiler drum, a third filtered output signal representative of feed-water flow rate into the boiler drum, a fourth filtered output signal representative of pressure in the boiler drum, and a fifth filtered output signal representative of temperature of the boiler drum;

a flow demand control unit configured to receive the first filtered output signal and generate an output signal representative of feed-water flow demand;

a shaping unit configured to receive the second, fourth, and fifth filtered output signals and generate an output signal representative of shaped steam flow rate as function of pressure, temperature, or combination thereof in the boiler drum; and a liquid level control unit configured to control the water level in the boiler drum within predetermined limits by controlling one or more components coupled to the boiler drum based on the output signals from the flow demand control unit, the shaping unit, and the third filtered output signal.

13. The system of claim 12, wherein the signal processing unit is configured to receive an output signal from the drum pressure sensor and generate an output signal representative of estimated steam flow rate from the boiler drum based on an output signal from the drum pressure sensor.

14. The system of claim 12, wherein the signal processing unit is configured to use drum geometric parameters, drum material properties, operating parameters, or combinations thereof when generating the filtered output signals.

15. The system of claim 12, wherein the signal processing unit is configured to generate an output signal representative of estimated steam flow rate from the boiler drum and use the output signal representative of estimated steam flow rate when generating the filtered output signals.

16. The system of claim 12, wherein the signal processing unit is configured to generate a filtered output signal representative of a set water level in the boiler drum.

17. The system of claim 12, wherein the signal processing unit is configured to generate at least one steam filter gain, and wherein the shaping filter is configured to use the at least one steam filter gain when generating the output signal representative of shaped steam flow rate as a function of pressure, temperature, or combination thereof in the boiler drum.

18. The system of claim 12; wherein the system is configured for controlling water level in the boiler drum provided in a power generation plant.

19. The system of claim 12, wherein the liquid level control unit is configured to control the water level in the boiler drum within predetermined limits by controlling a pressure control valve, blow down valve, feed-water control valve, or combinations thereof coupled to the boiler drum based on the output signals from the flow demand control unit, the shaping unit, and the third filtered output signal.

20. The system of claim 12, wherein the signal processing unit is configured to generate at least one controller gain, and wherein the flow demand control unit is configured to use the at least one controller gain to generate the output signal representative of feed-water flow demand.

21. The system of claim 20, wherein the variable controller gains comprises a variable proportional gain, and a variable integral gain determined based on a set water level in the boiler drum and a detected water level in the boiler drum.

* * * * *